INDUCTIVE DEVICE HAVING A PRECISELY SINUSOIDAL RELATION BETWEEN COUPLING AND RELATIVE DISPLACEMENT
Original Filed March 27, 1947 2 Sheets-Sheet 1

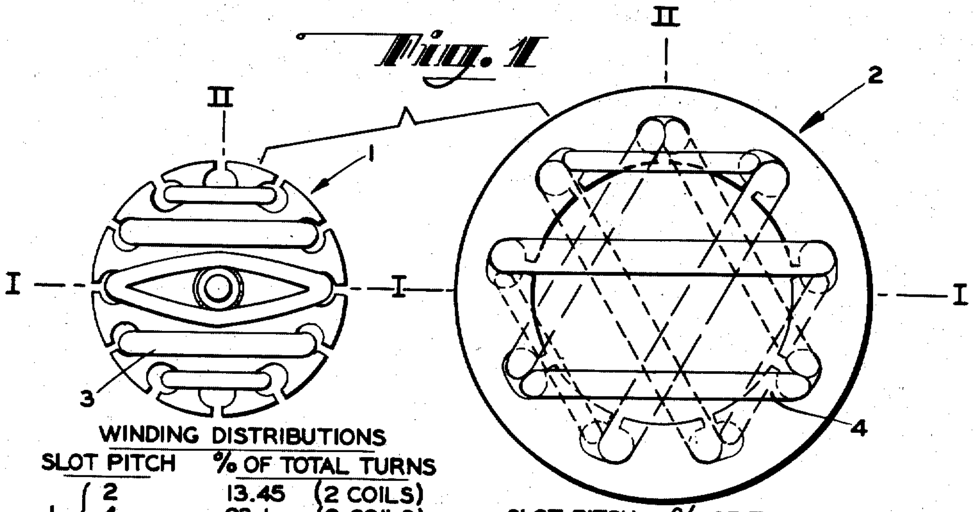

Fig. 1

WINDING DISTRIBUTIONS

| SLOT PITCH | | % OF TOTAL TURNS | |
|---|---|---|---|
| 1 | 2 | 13.45 | (2 COILS) |
| | 4 | 23.1 | (2 COILS) |
| | 6 | 26.9 | (1 COIL) |
| 2 | 1 | 6.7 | (2 COILS) |
| | 3 | 18.3 | (2 COILS) |
| | 5 | 25.0 | (2 COILS) |

| SLOT PITCH | % OF TOTAL TURNS PER PHASE |
|---|---|
| 4 | 53.2 |
| 3 | 34.7 |
| 2 | 12.1 |

3 Ø, Y CONNECTED

ALTERNATIVELY, WINDING MAY BE EITHER SINGLE-PHASE OR TWO-PHASE WITH NORMAL WINDING SPLIT AND OF LADDER-TYPE

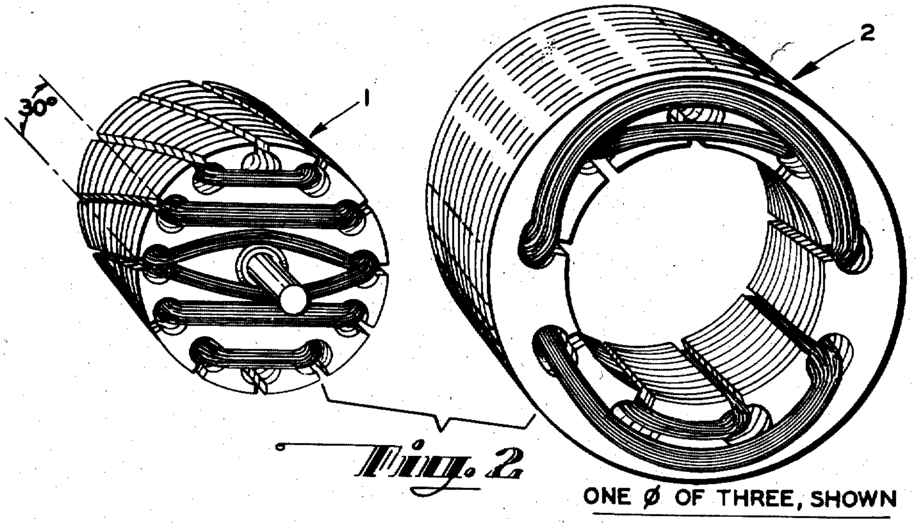

Fig. 2

ONE Ø OF THREE, SHOWN

INVENTORS
PAUL F. BECHBERGER
PANOS G. YEANNAKIS
BY Stephen Cerstvik
ATTORNEY

| SLOT PITCH | % OF TOTAL TURNS PER PHASE |
|---|---|
| 7 | 31.60 |
| 6 | 27.51 |
| 5 | 20.56 |
| 4 | 12.70 |
| 3 | 5.96 |
| 2 | 1.67 |

3ϕ, Y CONNECTED (1 ϕ SHOWN)

ALTERNATIVELY, WINDING MAY BE EITHER SINGLE-PHASE OR TWO-PHASE WITH NORMAL WINDING SPLIT AND OF LADDER-TYPE

INVENTORS
PAUL F. BECHBERGER
PANOS G. YEANNAKIS
BY Stephen Cerstvik
ATTORNEY

Patented May 1, 1951

2,550,663

UNITED STATES PATENT OFFICE 2,550,663

INDUCTIVE DEVICE HAVING A PRECISELY SINUSOIDAL RELATION BETWEEN COUPLING AND RELATIVE DISPLACEMENT

Paul F. Bechberger, Tenafly, and Panos G. Yeannakis, Maplewood, N. J., assignors to Bendix Aviation Corporation, Teterboro, N. J., a corporation of Delaware Continuation of application Serial No. 737,452, March 27, 1947. This application October 14, 1949, Serial No. 121,316

14 Claims. (Cl. 318—24)

The present invention relates to induction devices having relatively movable parts and, more particularly, to synchros commonly used telemetrically with alternating current energization, and is a continuation-in-whole of the invention disclosed in our abandoned application Serial No. 737,452, filed March 27, 1947, assigned to the same assignee as the present invention.

The invention relates especially to novel means by which a precisely sinusoidal relation is obtained, with a consequent improvement in telemetric accuracy.

This invention constitutes an improvement over the invention disclosed in co-pending application Serial No. 550,461, filed August 21, 1944, by John P. Glass, Jr., now Patent No. 2,488,771, dated November 22, 1949, assigned to the assignee of the present invention, in that the lowest-order uncancelled harmonic is of at least twice the order and hence is of considerably smaller possible magnitude because of the generally inverse relation existing between the maximum possible magnitude and the order of harmonic.

In the most efficient windings disclosed in said Glass Patent No. 2,488,771, the 17th and 19th harmonics are the lowest-order pair of uncancelled harmonics, their resultant error appearing as the 18th for reasons which appear in a recent article "Electrical Accuracy of Selsyn Generator-Control Transformer System" by Harold Chestnut, American Institute of Electrical Engineers Transactions, August-September 1946, volume 65, pages 570–576, on page 573 of which a 6th order error is shown to result from uncancelled 5th and 7th harmonics.

By one of the embodiments of the present invention, the 35th and 37th harmonics are the lowest orders uncancelled, with a consequent generally negligible error of the 36th harmonic.

In another embodiment of the present invention, the 59th and 61st harmonics are the lowest orders uncancelled, with a consequent still smaller possible error of the 60th harmonic.

Accordingly, one of the objects of the present invention is to provide novel and improved induction devices having a higher order of accuracy than was heretofore obtainable.

Another object is to provide novel and improved synchros, whereby the accuracy of telemetric transmission synchro systems is greatly improved by distributing the windings of both the rotor and the stator of each synchro unit in accordance with the distribution obtained by applying the method disclosed in said Glass Patent No. 2,488,771.

A further object is to provide novel and improved synchros, whereby production errors are made inappreciable with practicable manufacturing tolerances.

The above and other objects and advantages of the invention will appear more fully hereinafter from a consideration of the detailed description which follows, taken together with the accompanying drawings wherein two embodiments of the invention are illustrated. It is to be expressly understood, however, that the drawings are for the purpose of illustration and description only and are not intended as a definition of the limits of the invention, reference being had to the appended claims for this purpose.

In the drawings wherein like reference characters refer to like parts throughout the several views;

Fig. 1 is a front elevation of one embodiment of the invention, in which a 12-slot rotor and a 9-slot stator respectively appear on the lefthand and righthand sides, a synchro being shown by way of example. This view shows a winding distribution which provides the increased accuracy;

Fig. 2 is a perspective view of the same elements, in the same general relative positions, to show the relative skew and thickness of these elements.

Figure 3:
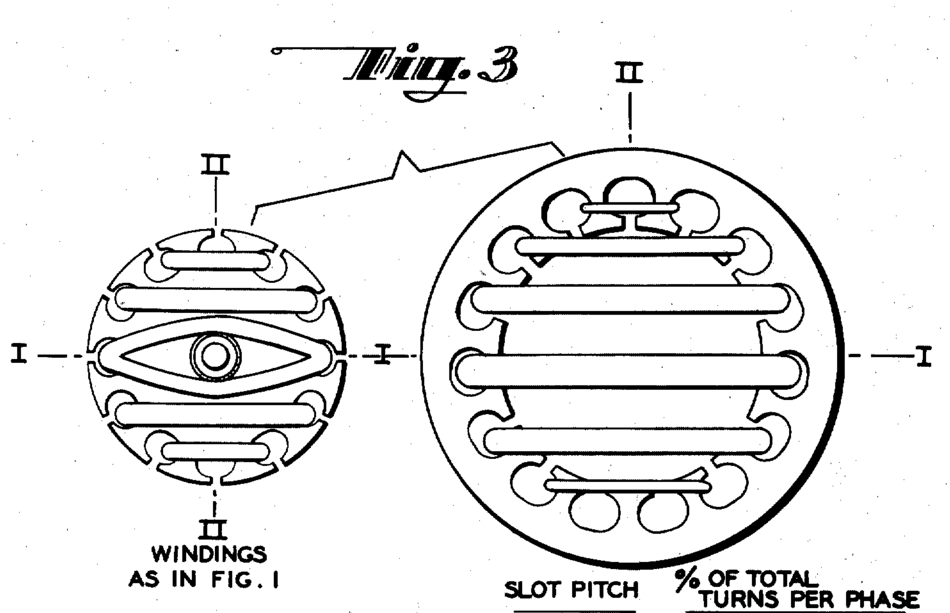
Fig. 3 is a view generally similar to Fig. 1 but showing a 15-slot stator with the same 12-slot rotor, a synchro combination of still higher accuracy.

Referring to Figs. 1 and 2, the rotor 1 is mounted to be angularly movable in stator 2, both being laminated and with 12 and 9 evenly spaced slots, respectively, as shown. Dummy slots (not shown) may, if desired, be used to provide effective slots where these need not contain coils.

The rotor 1 is bisymmetrical, i. e., symmetrical about two axes I—I and II—II which are normal to each other and to the axis of rotation, a non-salient bipole rotor being shown. This bisymmetry, as noted in said Glass patent, eliminates all even order harmonics of coupling to angle of relative displacement of rotor to stator.

The rotor winding 3 is distributed as shown in the distribution obtained by applying the method disclosed in the aforesaid Glass Patent No. 2,488,771, namely, in accordance with the distribution determined by the simultaneous solution of a number of equations each of which is equal to zero and represents a to-be-neutralized Fourier harmonic in the relation of the coupling to the relative position of the rotor and the stator, each of such equations including a finite series of sinusoidal terms expressing, for a respective independent coil and for the particular harmonic, the coupling factor of the coil as dependent upon both the number of its turns and the effective positions of its conducting bars at any number of equally spaced points, so that the independent coils have their bars effectively lumped at electrical angles which are integer multiples of the spacing between said points.

If the stator (or rotor) is provided with an odd number of slots as, for example, the stator shown in Figs. 1, 2 and 3, then the winding thereon is distributed according to the simultaneous solution of a plurality of equations of the formula including the pertinent terms in $$N_{(n-1)/2}\cos h\frac{90^\circ}{n}+N_{(n-3)/2}\cos 3h\frac{90^\circ}{n}+N_{(n-5)/2}\cos 5h\frac{90^\circ}{n}+\cdots+N_1\cos h(n-2)\frac{90^\circ}{n}=0 \qquad \text{(I)}$$

where N is the number of turns in a coil of slot pitch indicated by the subscript, $n$ is the odd number of slots in the stator (or rotor), and $h$ is the order of an appreciable odd harmonic to be suppressed, whereby each of the harmonics thus considered is substantially eliminated to obtain a sinusoidal relation between the angle of relative rotation and the ratio of the input and output voltages.

On the other hand, if the rotor (or stator) is provided with an even number of slots as, for example, the rotor shown in Figs. 1, 2 and 3, then the winding thereon is distributed according to the simultaneous solution of a plurality of equations of the formula including the pertinent terms in $$N_{(n/2-1)}\cos h\frac{90^\circ}{n/2}+N_{(n/2-3)}\cos 3h\frac{90^\circ}{n/2}+N_{(n/2-5)}\cos 5h\frac{90^\circ}{n/2}+\cdots+N_1\cos h(n/2-1)\frac{90^\circ}{n/2}=0 \qquad \text{(II)}$$

where N is again the number of turns in a coil of slot pitch indicated by the subscript, $n$ is the even number of slots in the rotor (or stator), and $h$ is the order of an appreciable odd harmonic to be suppressed as in Equation I.

It will thus be seen that Equations I and II are of identical form, except that Equation I is used when the rotor or stator is provided with an odd number of slots, and Equation II is used when the rotor or stator is provided with an even number of slots.

The aforesaid distribution of the rotor winding 3 directly eliminates all odd harmonics except the 11th. By symmetry, only the 13th; 23rd and 25th; 35th and 37th; . . . order odd harmonics are not neutralized. In other words, this rotor eliminates all odd harmonics except those of order $A12\pm1$, where A is any integer.

The rotor winding eliminates the 3rd and 17th harmonics. Since the rotor winding eliminates all harmonics divisible by three, this synchro may be used in two-phase, instead of 3-phase, connection with a 9-slot stator without error due to these harmonics even though said stator does not eliminate all of them.

The 3-phase, Y-connected windings 4 for the 9-slot stator are shown distributed as for one form in said Glass patent, Figs. 6 and 20 thereof. Said stator coil distribution relies upon the 3-phase Y-connection and/or the rotor winding distribution to eliminate the 3rd harmonic, and directly eliminates the 5th and 7th harmonics. By symmetry, the stator eliminates all odd harmonics except the 17th, 19th; 35th, 37th; . . . . In other words, this stator eliminates all harmonics except those of orders $B18\pm1$, where B is any integer.

Thus, it is evident that the synchro of Figs. 1 and 2 eliminates all harmonics up to the 35th and 37th orders, with a consequent generally negligible 36th harmonic error of the coupling to angle relation.

By applying the teachings of the aforesaid Glass patent in accordance with the present invention, a harmonic may be additionally eliminated as, e. g. by the use of a Y-connection in the winding of the rotor, which is shown as single-phase in Fig. 1, with a resultant decrease in permissible production tolerances.

Where still higher accuracy is required than is obtainable with the synchro of Figs. 1 and 2, the synchro of Fig. 3 may be used, with the lowest uncancelled harmonic appearing as an error of the 60th order.

The synchro of Fig. 3 has the 12-slot rotor of Figs. 1 and 2 but a 15-slot stator with the herein-stated winding distribution as in the aforesaid Glass patent, from Fig. 19 thereof and its context therein. With this 15-slot stator, the 3-phase, Y-connected windings are conveniently used, with a consequent double elimination of the 3rd harmonic as for Figs. 1 and 2.

For the 15-slot stator winding, in 3-phase Y-connection, any phase may be distributed as follows, from said Glass patent,

| Slot-pitch of independent coil | Per cent of total turns per phase |
|---|---|
| 7 | 31.60 |
| 6 | 27.51 |
| 5 | 20.56 |
| 4 | 12.70 |
| 3 | 5.96 |
| 2 | 1.67 |

so that this 15-slot stator directly eliminates all odd harmonics except the 29th, with the 31st; 59th, 61st; . . ., eliminated by symmetry.

In combination with the 12-slot rotor of the instant application, this 15-slot stator thus has the first coincidence of uncancelled harmonics appear as the 59th and 61st which result in a 60th harmonic error of the coupling-to-angle relation. As earlier brought out herein, this higher order of the lowest-order uncancelled harmonic results in a worthwhile reduction in the magnitude of the error.

Although only two embodiments of the invention have been illustrated and described, various changes and modifications in the form and relative arrangement of the parts, which will now be apparent to those skilled in the art, may be made without departing from the scope of the invention. Reference is, therefore, to be had to the appended claims for a definition of the limits of the invention.

In particular, the use in the claims of "rotor" and "stator" is for conciseness but these are intended to be used interchangeably, and to have as equivalents linear inductive elements which are relatively movable longitudinally without change of their distance apart. Likewise "one effective slot-pitch relative skewing" of the inductive elements means that the slot-pitch is that of the skewed element, e. g. 30° skew of a 12-slot rotor or 40° skew of a 9-slot stator whichever is skewed (preferably the rotor only as a matter of mechanical convenience). Throughout the claims: the stated harmonics are in the relation of the coupling to the relative angle between rotor and stator, and also a "number of equally spaced slots" is intended to include slots angularly spaced by integer-mulitples of 360°/M, where M is a positive integer. And "substantially," as applied to the winding distribution, means that the total number of turns in any coil is within either one turn or 2 per cent (based on the total number of turns), whichever is the larger of the theoretical value.

What is claimed is:

1. In an electrical device, the combination of two relatively movable inductively coupled elements, each of said elements having a winding distributed into coils with the number of turns in each independent coil substantially in accordance with the distribution determined by the simultaneous solution of a number of equations each of which is equal to zero and represents a to-be-neutralized Fourier harmonic in the relation of the coupling to the relative position of said two elements, each of said equations including a finite series of sinusoidal terms, and each of said terms expressing, for a respective independent coil and for the particular harmonic, the coil's coupling factor as dependent upon both the number of its turns and the effective positions of its conducting bars at any of a number of equally spaced points so that the independent coils have their bars effectively lumped at electrical angles which are integer multiples of the spacing between said points.

2. In an electrical alternating current device having two inductively coupled relatively movable elements, a winding on each of said elements distributed to have the average numer of the conductor bars of said winding per electrical degree vary with the electrical angle of the bars from a neutral-coupling reference position over a range of up to 90 electrical degrees substantially according to the solution of a determinant which includes a number of equations each of which is equal to zero and represents a to-be-neutralized harmonic in the relation of the coupling to the relative position of said two elements, each of said equations including a finite series of sinusoidal terms, and each of said terms expressing, for each bar and the particular harmonic, the bar's coupling factor as dependent upon its electrical angle from the reference position.

3. An electrical alternating current device having two inductively coupled relatively movable elements having windings, each of said elements being constructed to have an integral number of evenly spaced slots per an integral number times 360 electrical degrees and its winding in a selected number of said slots with a number of turns of each independent coil of different slot-pitch, the number of turns of each such coil being substantially in accordance with the solution of a determinant which includes a number of equations each of which is equal to zero and represents a to-be-neutralized harmonic in the relation of the coupling to the relative position of said two elements, each of said equations including a finite series of sinusoidal terms, and each of said terms expressing, for each independent coil and the particular harmonic, the coil's coupling factor as dependent upon its slot-pitch.

4. An electrical A. C. device having relatively movable rotor and stator elements, one of said elements including a selected number of independent coils wound symmetrically about an axis normal both to that of said coils and to that of relative rotation upon a core having an odd number of equally-spaced slots, substantially according to the simultaneous solution of a plurality of equations of the formula including the pertinent terms in $$N_{(n-1)/2}\cos h\frac{90^\circ}{n}+N_{(n-3)/2}\cos 3h\frac{90^\circ}{n}+N_{(n-5)/2}\cos 5h\frac{90^\circ}{n}+\cdots+N_1\cos h(n-2)\frac{90^\circ}{n}=0$$

where N is the number of turns in a coil of slot pitch indicated by the subscript, $n$ is the odd number of slots in said core, and $h$ is the order of an appreciable odd harmonic to be suppressed, whereby each of the harmonics thus considered is substantially eliminated to obtain a sinusoidal relation between the angle of said relative rotation and the ratio of the output and input voltages, the other of said elements including a selected number of independent coils wound symmetrically about an axis normal both to that of said coils and to that of relative rotation upon a core having an even number of equally-spaced slots, substantially according to the simultaneous solution of a plurality of equations of the formula including the pertinent terms in $$N_{(n/2-1)}\cos h\frac{90^\circ}{n/2}+N_{(n/2-3)}\cos 3h\frac{90^\circ}{n/2}+N_{(n/2-5)}\cos 5h\frac{90^\circ}{n/2}+\cdots+N_1\cos h(n/2-1)\frac{90^\circ}{n/2}=0$$

where N is the number of turns in a coil of slot pitch indicated by the subscript, $n$ is the even number of slots in said core, and $h$ is the order of an appreciable odd harmonic to be suppressed, whereby each of the harmonics thus considered is substantially eliminated to obtain a sinusoidal relation between the angle of said relative rotation and the ratio of the output and input voltages.

5. An electrical A. C. device having relatively movable rotor and stator elements, said stator element including a selected number of independent coils wound symmetrically about an axis normal both to that of said coils and to that of relative rotation upon a core having an odd number of equally-spaced slots, substantially according to the simultaneous solution of a plurality of equations of the formula including the pertinent terms in $$N_{(n-1)/2}\cos h\frac{90^\circ}{n}+N_{(n-3)/2}\cos 3h\frac{90^\circ}{n}+N_{(n-5)/2}\cos 5h\frac{90^\circ}{n}+\cdots+N_1\cos h(n-2)\frac{90^\circ}{n}=0$$

where N is the number of turns in a coil of slot pitch indicated by the subscript, $n$ in the odd number of slots in said core, and $h$ is the order of an appreciable odd harmonic to be suppressed, whereby each of the harmonics thus considered is substantially eliminated to obtain a sinusoidal relation between the angle of said relative rotation and the ratio of the output and input voltages, said rotor element including a selected number of independent coils wound symmetrically about an axis normal both to that of said coils and to that of relative rotation upon a core having an even number of equally-spaced slots, substantially according to the simultaneous solution of a plurality of equations of the formula including the pertinent terms in $$N_{(n/2-1)} \cos h\frac{90°}{n/2}+N_{(n/2-3)} \cos 3h\frac{90°}{n/2}+$$

$$N_{(n/2-5)} \cos 5h\frac{90°}{n/2}+\cdots+N_1 \cos h(n/2-1)\frac{90°}{n/2}=0$$

where N is the number of turns in a coil of slot pitch indicated by the subscript, $n$ is the even number of slots in said core, and $h$ is the order of an appreciable odd harmonic to be suppressed, whereby each of the harmonics thus considered is substantially eliminated to obtain a sinusoidal relation between the angle of said relative rotation and the ratio of the output and input voltages.

6. An inductive device of the class including synchros, comprising a stator and a rotor relatively movable angularly thereof, said rotor being bisymmetrical non-salient bipole, whereby all even harmonics are eliminated, with 12 equally spaced effective slots containing coils with their windings distributed substantially as follows:

| | | | |
|---|---|---|---|
| Slot pitch | 2 | 4 | 6 |
| Per cent of total turns | 13.45 | 23.1 | 26.9 |
| Coils | 2 | 2 | 1 |

said stator being symmetrical with an integer C of equally spaced effective slots with coils wound in a selected number of said slots to eliminate most of the otherwise uncancelled odd harmonic content except of orders $DC\pm1$, where D is an even integer when C is odd and vice versa.

7. An inductive device of the class including synchros, comprising a stator and a rotor relatively movable angularly thereof, said rotor being bisymmetrical non-salient bipole, whereby all even harmonics are eliminated, with 12 equally spaced effective slots containing coils with their windings distributed substantially as follows:

| | | | |
|---|---|---|---|
| Slot pitch | 1 | 3 | 5 |
| Per cent of total turns | 6.7 | 18.3 | 25.0 |
| Coils | 2 | 2 | 2 |

said stator being symmetrical with an integer number C of equally spaced effective slots with coils wound in a selected number of said slots to eliminate most of the otherwise uncancelled odd harmonic content except of orders $DC\pm1$, where D is an even integer when C is odd and vice versa.

8. An inductive device of the class including synchros, comprising a stator and a rotor relatively movable angularly thereof, said rotor being bisymmetrical bipole, whereby all even harmonics are eliminated, with an even number A of equally spaced slots some of which contain coils with their windings distributed to eliminate most of the otherwise uncancelled odd harmonic content except of orders $BA\pm1$, where B is any integer; said stator being symmetrical with 9 evenly spaced effective slots containing 3-phase windings with each phase-winding distributed substantially as follows in unsplit coils:

| | | | |
|---|---|---|---|
| Slot pitch | 4 | 3 | 2 |
| Per cent of total turns | 53.2 | 34.7 | 12.1 |

9. An inductive device of the class including synchros, comprising a stator and a rotor relatively movable angularly thereof, said rotor being bisymmetrical bipole, whereby all even harmonics are eliminated, with an even number A of equally spaced slots some of which contain coils with their windings distributed to eliminate most of the otherwise uncancelled harmonic order content except of orders $BA\pm1$, where B is any integer; said stator being symmetrical with 15 evenly spaced effective slots containing 3-phase windings with each phase-winding distributed substantially as follows in unsplit coils:

| | | | | | | |
|---|---|---|---|---|---|---|
| Slot pitch | 7 | 6 | 5 | 4 | 3 | 2 |
| Per cent of total turns | 31.6 | 27.5 | 20.5 | 12.7 | 6.0 | 1.7 |

10. An inductive device of the class including synchros, comprising a stator and a rotor, said rotor being bisymmetrical non-salient bipole, whereby all even harmonics are eliminated, with 12 equally spaced effective slots containing coils with their windings distributed substantially as follows:

| | | | |
|---|---|---|---|
| Slot pitch | 2 | 4 | 6 |
| Per cent of total turns | 13.45 | 23.1 | 26.9 |
| Coils | 2 | 2 | 1 |

said stator being symmetrical with 9 equally spaced effective slots containing 3-phase windings with each phase winding distributed substantially as follows:

| | | | |
|---|---|---|---|
| Slot pitch | 4 | 3 | 2 |
| Per cent of total turns | 53.2 | 34.7 | 12.1 |

11. An inductive device of the class including synchros, comprising a stator and a rotor, said rotor being bisymmetrical non-salient bipole, whereby all even harmonics are eliminated, with 12 equally spaced effective slots containing coils with their windings distributed substantially as follows:

| | | | |
|---|---|---|---|
| Slot pitch | 1 | 3 | 5 |
| Per cent of total turns | 6.7 | 18.3 | 25.0 |
| Coils | 2 | 2 | 2 |

said stator being symmetrical with 9 equally spaced effective slots containing 3-phase windings with each phase winding distributed substantially as follows:

| | | | |
|---|---|---|---|
| Slot pitch | 4 | 3 | 2 |
| Per cent of total turns | 53.2 | 34.7 | 12.1 |

12. An inductive device of the class including synchros, comprising a stator and a rotor, said rotor being bisymmetrical non-salient bipole, whereby all even harmonics are eliminated, with 12 equally spaced effective slots containing coils with their windings distributed substantially as follows:

| | | | |
|---|---|---|---|
| Slot pitch | 2 | 4 | 6 |
| Per cent of total turns | 13.45 | 23.1 | 26.9 |
| Coils | 2 | 2 | 1 |

said stator being symmetrical with 9 equally spaced effective slots containing 3-phase windings with each phase winding distributed substantially as follows:

| | | | | | | |
|---|---|---|---|---|---|---|
| Slot pitch | 7 | 6 | 5 | 4 | 3 | 2 |
| Per cent of total turns | 31.6 | 27.5 | 20.5 | 12.7 | 6.0 | 1.7 |

13. An inductive device of the class including synchros, comprising a stator and a rotor, said rotor being bisymmetrical non-salient bipole, whereby all even harmonics are eliminated, with 12 equally spaced effective slots containing coils with their windings distributed substantially as follows:

| | | | |
|---|---|---|---|
| Slot pitch | 1 | 3 | 5 |
| Per cent of total turns | 6.7 | 18.3 | 25.0 |
| Coils | 2 | 2 | 2 |

said stator being symmetrical with 9 equally spaced effective slots containing 3-phase windings with each phase winding distributed substantially as follows:

| | | | | | | |
|---|---|---|---|---|---|---|
| Slot pitch | 7 | 6 | 5 | 4 | 3 | 2 |
| Per cent of total turns | 31.6 | 27.5 | 20.5 | 12.7 | 6.0 | 1.7 |

14. An electrical A. C. device having relatively rotatable rotor and stator elements, one of said elements including a selected number of independent coils wound symmetrically about an axis normal both to that of said coils and to that of relative rotation upon a core having an even number of equally-spaced slots, substantially according to the simultaneous solution of a plurality of equations of the formula including the pertinent terms in $$N_{(n/2-1)} \cos h\frac{90°}{n/2} + N_{(n/2-3)} \cos 3h\frac{90°}{n/2} + N_{(n/2-5)} \cos 5h\frac{90°}{n/2} + \cdots N_1 \cos h(n/2-1)\frac{90°}{n/2} = 0$$

where N is the number of turns in a coil of slot pitch indicated by the subscript, $n$ is the even number of slots in said core, and $h$ is the order of an appreciable odd harmonic to be suppressed, whereby each of the harmonics thus considered is substantially eliminated to obtain a sinusoidal relation between the angle of said relative rotation and the ratio of the output and input voltages.

PAUL F. BECHBERGER.
PANOS G. YEANNAKIS.

REFERENCES CITED

The following references are of record in the file of this patent:

UNITED STATES PATENTS

| Number | Name | Date |
|---|---|---|
| 2,488,771 | Glass, Jr. | Nov. 22, 1949 |